Figures 1, 2:
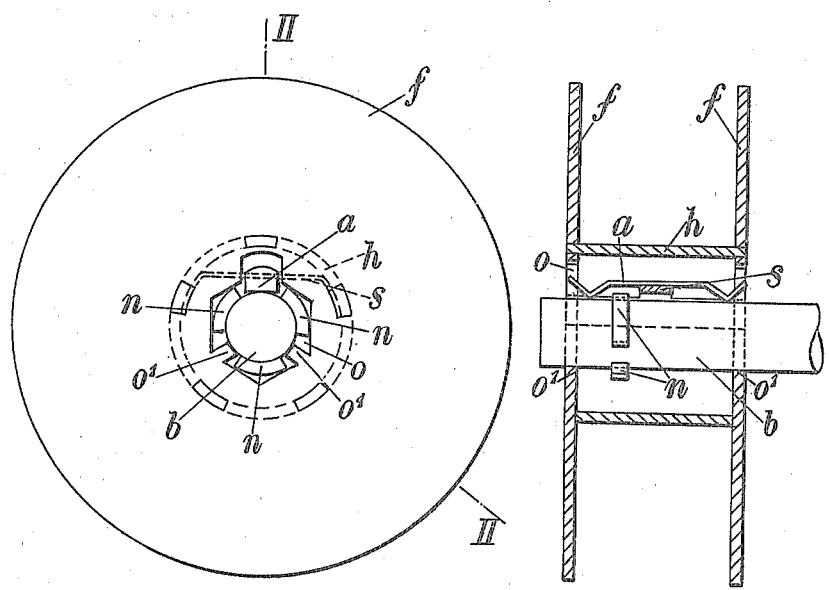

April 15, 1941.  K. SANO  2,238,189
FILM REEL
Filed Sept. 27, 1938

K. Sano
Inventor
By Glascock Downing & Seebold
Attys.

Patented Apr. 15, 1941

2,238,189

UNITED STATES PATENT OFFICE 2,238,189

FILM REEL

Karel Sano, Borsbeeck, near Antwerp, Belgium, assignor to Gevaert Photo-Producten N. V., Oude-God, Antwerp, Belgium Application September 27, 1938, Serial No. 231,980
In Austria October 5, 1937

2 Claims. (Cl. 242—70)

This invention relates to a spool in particular for the winding-on of cinematograph and other photographic films consisting essentially of two spool flanges which are spaced a given distance one from the other by a cylindrical hollow core (winding core).

A spool in accordance with the present invention comprises end flanges, a hollow core member extending between said end flanges and within the core member a leaf spring secured at its midpoint thereto, the ends of the leaf spring being deflected so that they will bear against a spool axle which is provided in the device with which the spool is designed to be associated and constrain points on the spool remote from the spring into contact with the spool axle. In this way it is ensured that even with spool axles of different dimensions (the openings in the spool flanges being so large that they permit the passage of axles of different thicknesses) an inclination of the spool and the consequent disadvantage will be effectively avoided.

The small eccentricities between the centre of the winding core and the centre of the spool axle arising from the use of axles of different diameter or thickness are in consequence of subsidiary importance, as such eccentricities can scarcely disturb the winding-on operation.

Spools according to the invention can be employed as driven spools and also as loose spools.

The drawing shows, by way of example, one construction in accordance with the invention—

Figure 1 being a view in side elevation of the spool,

Figure 2 a section on the line II—II of Figure 1.

The two spool flanges $f$ are connected together by a hollow core $h$. The flanges $f$ have each in their centres an opening $o$ which is larger than the axle $b$ as shown in the example illustrated, so that axles of greater diameter can be employed.

The axle $b$ abuts against projections $o'$ on the edge of the opening $o$ and is pressed against these projections by the leaf spring $a$. The leaf spring $a$ is preferably secured within the hollow core $h$ on a bridge $s$ provided in the inside of the hollow core.

The pressing of the axle $b$ on the elevations $o'$ can naturally also be effected by a plurality of springs which are independent one of the other. These springs need not necessarily be in the form of leaf springs but can, for example, be coil springs.

In order to render it more difficult to withdraw the spool from the axle cams $n$ are provided thereon, which only by a particular adjustment of the spool with respect to the axle and, namely, the position shown in Figure 1, can they pass through correspondingly formed openings $o$ in the spool flanges.

For the appropriate packing of the spool axle relatively to the spool or conversely, the projections $o'$ are naturally not absolutely essential but the support or bearing can be also secured by the periphery of the opening itself without providing therein projecting portions.

I claim:

1. A spool comprising end flanges having openings permitting the passage therethrough of a spool axle, a hollow core member extending between the flanges, a supporting member transversely mounted within the core member at a point intermediate the end flanges, and a spring member secured at its mid point to the supporting member and extending at right angles thereto, the ends of the spring member adjacent to the end flanges being deflected so that they will bear against the spool axle and draw the edges of the openings in the end flanges diametrically opposite the said spring member into direct contact with the axle.

2. A device of the character described including in combination a spool axle, a spool including end flanges provided with openings having a series of enlarged recesses radiating therefrom to leave a series of spaced supporting portions, a series of collars arranged in spaced relation about the spool axle and of a shape substantially corresponding to the enlarged recesses and registrable therewith to allow engagement of the spool with the axle and adapted on slight turning of the spool to prevent accidental disengagement of the spool from the axle, a hollow core member extending between the flanges, a supporting member mounted transversely on the inner surface of the core member at a point substantially intermediate the end flanges and a spring member secured at its mid point to the supporting member and extending at right angles thereto, the ends of the spring member being deflected so that they will bear against the spool axle and draw the edges of the openings in the end flanges diametrically opposite the spring member into direct contact with the axle.

KAREL SANO.